United States Patent Office 3,443,086
Patented May 6, 1969

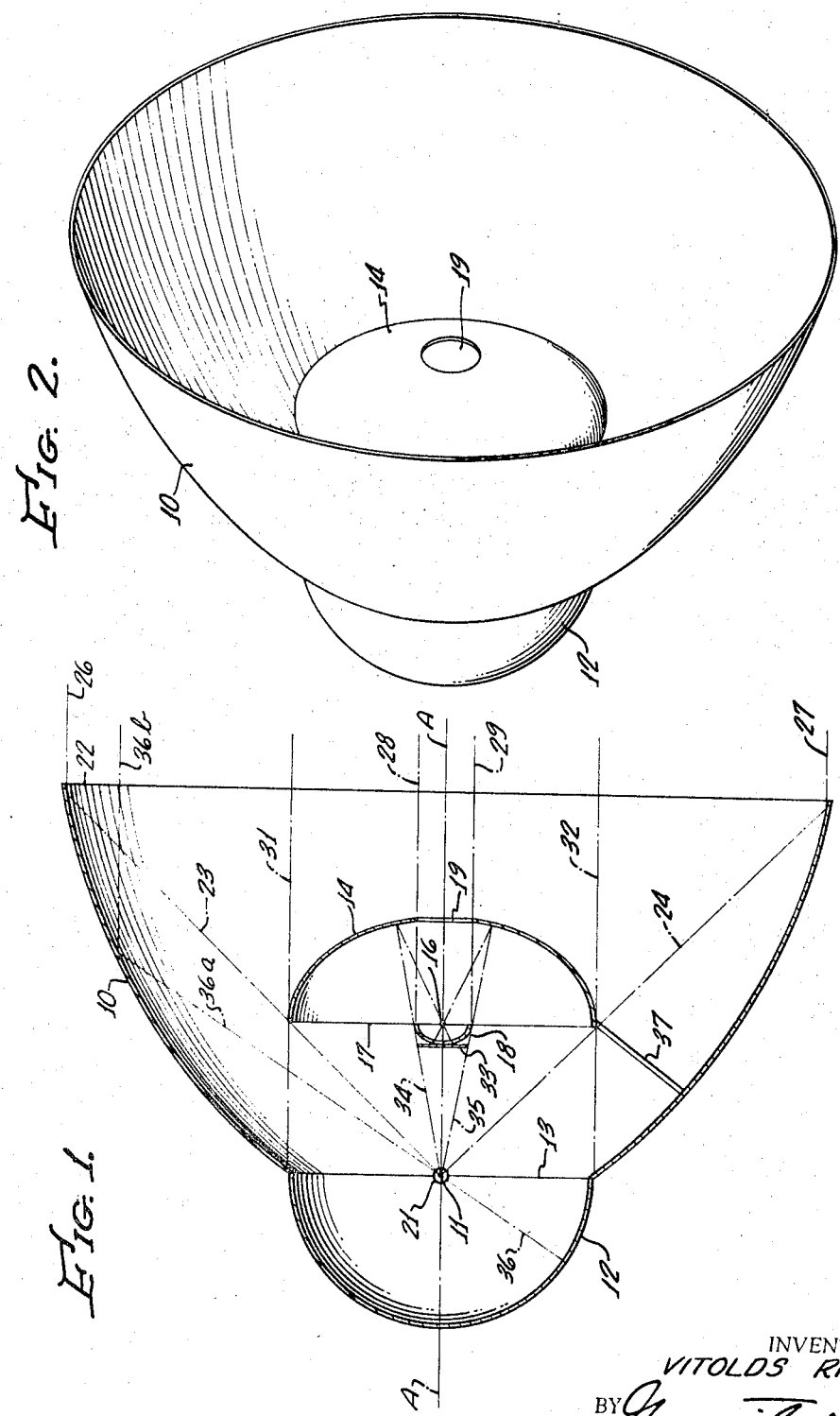

3,443,086
BEAM-FORMING SYSTEM
Vitolds Rikis, Costa Mesa, Calif., assignor to Giannini Scientific Corporation, Amityville, N.Y., a corporation of Delaware
Filed May 16, 1967, Ser. No. 638,821
Int. Cl. F21v 7/09
U.S. Cl. 240—41.1   16 Claims

ABSTRACT OF THE DISCLOSURE

The disclosure relates to a beam-forming system, for use in searchlights and elsewhere, in which an elliptical reflector is disposed within a parabolic reflector to receive radiation not incident to such parabolic reflector. Reflections from the elipse are directed to a second parabolic reflector and thence in a beam parallel to that from the first-mentioned parabolic reflector. A re-imaging reflector is provided for the radiation source.

BACKGROUND OF THE INVENTION

Field of the invention

The invention is in the field of optics, etc., wherein radiation from a light or other radiation source is directed in a beam to a desired point of use. More specifically, the invention is in the field of reflective beam-forming systems, as distinguished from refractive systems.

Description of the prior art

Beam-forming systems of the refractive type are characterized by excessive weight, fragility, and difficulty of cooling the refractive elements in a high-power illuminator. However, refractive-type beam-forming systems are relatively small in size and have a reasonably good optical collection efficiency.

Because of the defects and deficiencies of refractive systems, reflective beam-forming systems are frequently employed. Reflective systems are relatively light in weight, and sturdy, but have had various defects including poor collection of source radiation, creation of stray radiation and consequent interference with other optical systems, and degradation of visual security. Furthermore, such reflective systems were often low in efficiency, excessively large and bulky in size, and insufficiently capable of varying the characteristics of and radiation distribution in the beam.

In view of the above, it is an object of the present invention to provide a beam-forming system which combines the light weight and sturdiness of a reflective system with the relatively small size and optical collection efficiency of an advanced refractive system.

SUMMARY OF THE INVENTION

The present invention comprises a combination of elliptical and parabolic (or equivalent) reflectors located one within the other and so related to a light or other radiation source that only a minute portion (if any) of the light or other radiation is scattered instead of being transmitted in the desired beam. A hemispherical re-imaging reflector is provided to increase greatly the efficiency of the radiation source. The sizes, focal points, etc., of the various reflectors are so related to each other that the maximum-possible forwardly-traveling radiation (the radiation not reflected by the re-imaging reflector) is directly incident to a relatively large parabolic reflector and formed into a large beam thereby. The remaining forwardly-traveling radiation, which is not incident to such large reflector so that it would otherwise be scattered or require masking, is incident to an elliptical reflector which, in turn, directs such radiation to a second and much smaller parabolic reflector. Such smaller parabolic reflector directs the radiation in a small beam concentric with and parallel to the above-indicated large beam. The small and large beams merge or blend a desired distance from the apparatus, in accordance with various factors including the sizes, focal lengths, etc., of the various elements.

BRIEF DESCRIPTION OF THE DRAWING

FIGURE 1 is a schematic sectional view taken in a medial plane longitudinally of the apparatus and showing the relationships between the various reflectors; and
FIGURE 2 is an isometric view illustrating one form of the beam-forming system, such form incorporating surfaces of revolution in order to generate a cylindrical beam.

DESCRIPTION OF THE PREFERRED EMBODIMENT

Throughout this specification, and in the appended claims, the word "parabola" shall be interpreted to include elements, such as certain sections of spheres, which are generally equivalent to parabolas in their beam-forming capability. Correspondingly, the word "ellipse" includes certain other elements, such as ellipsoids, having several focal points. The word "hemisphere" also denotes certain hemispheroids, etc., including portions of hemispheres and hemispheroids.

The present reflector system is illustrated and described as being composed of surfaces of revolution about a predetermined axis (which axis is the same for each surface), so that a generally cylindrical beam is formed. It is to be understood, however, that the specification and claims also relate to other geometries—such as those adapted to form a rectangular beam. In the latter case, the surfaces are not surfaces of revolution but instead have portions which are symmetrical about a medial plane. Stated otherwise, although the reflector system shown in FIGURES 1 and 2 is characterized by radial symmetry about an axis, the invention may also be incorporated in a system which is characterized by bilateral symmetry about a plane. Both such types of beam-forming systems are intended to be covered by the following specification and claims.

A relatively large beam-forming reflector is shown at 10 as being a parabola of revolution about the common axis A. The small or apex end of the paraboda is cut off parabola 10 is located at 11, being also on the indicated axis A. The small or apex end of the parabola is cut off at the latus rectum thereof.

The cut-off central region of parabola 10 is replaced by a re-imaging reflector 12 which is hemispherical about focal point 11, being also a surface of revolution about axis A. The equatorial plane of hemisphere 12 contains focal point 11 and, furthermore, is coincident with the latus rectum of parabola 10. Such equatorial plane and latus rectum are indicated generally at 13, and include the circular region where the peripheral or rim portion of hemisphere 12 meets or joins the small end of parabola 10.

Both parabola 10 and hemisphere 12 face "forwardly," that is to say in the desired direction of beam transmission. Correspondingly, light rays which are not incident to hemisphere 12 are termed "forwardly-traveling."

An elliptical reflector section 14, also comprising a surface or revolution about axis A, has a first focal point at 11 and a second point at 16 (both lying on axis A). The elliptical section 14 faces rearwardly, toward hemisphere 12, but is spaced a substantial distance therefrom and from parabola 10. The rim or large-diameter edge 17 of elliptical reflector section 14 lies in the latus rectum thereof, being in the same plane (perpendicular to axis A) as is focal point 16. The diameter of rim 17 is the same as that of hemisphere 12 (and of the small-diameter end of parabola 10).

The elliptical reflector section 14 is much less than half of a complete ellipse, that is to say extends parallel to axis A for a distance less than half the length of a complete ellipse. Focal point 16 of the elliptical section 14 is disposed between focal point 11 and the rim (large-diameter lip or mouth) of parabolic reflector 10. The elliptical reflector 14 is much smaller than is parabolic reflector 10, being contained therein as illustrated.

A second and much smaller parabolic reflector, shown at 18, is also a surface of revolution about axis A and faces forwardly, being so located that its focal point coincides with the focal point 16 of elliptical section 14. Parabola 18 is also cut off at the latus rectum thereof, but in this case (unlike parabola 10) the central or apex region is retained instead of omitted. The latus rectum of the second and relatively small parabola 18 coincides with that of ellipse 14, and contains edge 17 and also the edge of parabola 18. Thus, the rims or edges of elements 14 and 18 are co-planar.

The central region of the elliptical section 14 is cut out to form a round opening or hole 19 the diameter of which should be at least as large as the diameter of the parabola 18 (which is much smaller than ellipse 14). The center of the opening 19 is on axis A.

A suitable radiation source, indicated at 21, is disposed at focal point 11 (of the parabola 10 and of the elliptical section 14, and which is also the center of hemisphere 12). The radiation source may comprise a filament, electric arc, etc., any other source of visible or invisible light, or any source of electromagnetic radiation.

The axial distance between the rim (and latus rectum) 17 of elliptical section 14, and the joint (at 13) between hemisphere 12 and parabola 10, is correlated to the location of the large-diameter edge or rim 22 of parabola 10. Such rim 22 lies in a plane perpendicular to axis A, and parallel to the rim (and latus rectum 17). The manner of correlation is such that the forwardly-traveling radiation from source 21 which is incident to the rim 22 will not be blocked by the rim 17 of the elliptical section 14. However, the manner of correlation is also such that any forwardly-traveling radiation not incident to any portion of the parabola 10 will strike the elliptical section 14 instead of being scattered.

Reference is made to the two lines 23 and 24 which lie on the surface of an imaginary cone having its apex at focal point 11 and its base at rim 22 of parabola 10. Light rays from source 21 and which pass along the lines 23 and 24 will engage rim 22 and be formed thereby into a large cylindrical beam as indicated by parallel lines 26 and 27. Also, any forwardly-traveling light rays which are above line 23 or below line 24 (that is to say, are located outwardly of lines 23–24) will be incident to parabola 10 and will also form part of the beam of parallel rays.

The gerat majority of forwardly-traveling light rays which are below line 23 or above line 24 (that is to say, which are located within the indicated cone) will be incident to the elliptical section 14 and reflected therefrom to the second focal point 16. The rays thus arriving at focal point 16, which is also the focal point of small ellipse 18, will be formed by such small ellipse into a small beam which emanates through opening 19 and is indicated generally by lines 28 and 29.

The small beam emanating throguh opening 19 is spaced radially-inwardly from the large beam which results from reflections off parabola 10. A shaded annulus is thus defined at the outside by lines or rays 31 and 32 and at the inside by lines or rays 28 and 29 (that is to say, by the cylinders containing such lines or rays). Rays 31 and 32 are those which pass substantially vertically from source 21 (when axis A is horizontal as indicated) to the small-diameter end of parabola 10, being reflected from such small-diameter end past the rim 17 of ellipse 14 without striking such ellipse.

Various parameters in the system, such as sizes, spacings, focal points, etc., may be varied in such manner as to decrease or increase the radial dimension of the shaded annulus which lies between the large-diameter and small-diameter beams (e.g., between lines 31 and 28), to thus vary the energy concentration in the combined beam. At a predetermined distance from the optical system, the two beams merge because of the fact that they are not perfectly parallel. The lack of parallelism is due to such factors as the finite size of source 21, etc. The distance from the optical system where the two beams merge may be adjusted or regulated in various desired manners.

A very small proportion of the light from source 21 and which is within the above-indicated cone (between lines 23 and 24) is shaded by the back of the small parabola 18. Such parabola is preferably caused to be as small as possible, in order to minimize this shaded region. A flat mirror, in the form of a disc 33 and lying in a plane perpendicular to axis A, may be mounted on the rear face of parabola 18 in order to shield the same from heat from source 21, and also to reflect energy from such source back to the source 21 as well as to hemisphere 12. The mirror 33 may also be a portion of a sphere having a center at 11, and furthermore may be a portion of a cylinder (particularly when the light source 21 is somewhat elongated, the axis of such cylinder then being parallel to that of the light source).

The cone of light which strikes mirror 33 is defined within the lines or rays 34 and 35, which also lie on the surface of an imaginary cone having an apex at 11. Any light outside of such lines 34 and 35 is either incident to the elliptical section 14 (if between lines 23 and 24) or is incident to the large parabola 10 as described above.

The hemispherical reflector 12 re-images any rearwardly-directed radiation back to the focal point 11 and thence through such focal point to the reflector 10 or 14. Thus, the efficiency of the source is increased. For example, line 36 represents a ray from source 21 which reflects back off reflector 12 to the source 21. Such ray or an equivalent then passes along line 36a to reflector 10, and then along line 36b as part of the large beam. Correspondingly, if the ray 36 were to strike the re-imaging reflector 12 nearer the axis A it would be reflected back through source 21 to the elliptical reflector section 14, thence to focus 16 of such section 14, and thence to the small parabolic reflector 18 for reflection as part of the small beam.

It is pointed out that the elliptical reflector 14 is so sized and located that both the direct radiation to reflector 10, and the reflected radiation therefrom, will clear elliptical reflector 14.

The various elements may be mounted and associated in suitable ways. For example, mounting may be effected by brackets, connectors, etc., one of which is indicated at 37 in FIGURE 1 and is for the purpose of connecting the periphery of the elliptical section 14 to parabola 10. It is to be understood that other connectors, not shown, connect the parabola 18 to the radiation source and/or to elliptical section 14. Furthermore, connectors additional to the one indicated at 37 are provided between the elements 10 and 14. The shaded angle between lines 34 and 35 may be advantageously employed for mounting purposes, since a brace or connector (not shown) from source 21 may extend along axis A to mirror 33.

The present beam-forming system is useful in searchlights, illuminators, projectors, etc. It may be also employed in a monochromator, runway illuminator for an airfield, outdoor theatrical lighter, solar furnace, spotlight for an incandescent lamp, precise-area illuminator, etc.

The reflective surfaces are preferably first-surface reflectors. Such surfaces may be coated with various materials, for example gold, in order to emphasize infrared or other portions of the spectrum.

The words "focal region," as employed in the appended claims, refer to the regions surrounding and relatively near the respective points 11 and 16. The words "parabola," "hemisphere," etc., relate to the interior (concave) surfaces since the shapes of the exterior or convex surfaces are relatively unimportant to the present system. The word "rim," in the case of systems which are not surfaces of revolution, denotes the terminal edges which are parallel to the medial plane.

The foregoing detailed description is to be clearly understood as given by way of illustration and example only, the spirit and scope of this invention being limited solely by the appended claims.

I claim:

1. A beam-forming system, which comprises:
 a first forwardly-facing parabolic reflector having a focal region at which a radiation source is adapted to be located,
 an elliptical reflector disposed within said first parabolic reflector and facing rearwardly toward said focal region,
  said elliptical reflector having a first focal region coincident with said focal region of said first parabolic reflector,
  said elliptical reflector also having a second focal region disposed between said first focal region and the rim of said first parabolic reflector.
  said elliptical reflector having a rim spaced a substantial distance from said first parabolic reflector whereby a large portion of the radiation from said first focal region will be directly incident to said first parabolic reflector and will form a large beam therefrom,
  said elliptical reflector having a central opening therein, and
 a second forwardly-facing parabolic reflector mounted between said elliptical reflector and said first focal region,
  said second parabolic reflector being much smaller than said elliptical reflector,
  said second parabolic reflector having a focal region coincident with said second focal region of said elliptical reflector,
  said second parabolic reflector being so related to said elliptical reflector that a large portion of the remaining radiation from said source will be reflected from said elliptical reflector to said second parabolic reflector and thence through said opening in a small beam parallel to the large beam from said first parabolic reflector.

2. The invention as claimed in claim 1, in which re-imaging means are provided adjacent said first focal region to reflect thereto radiation not incident to said first parabolic reflector or to said elliptical reflector.

3. The invention as claimed in claim 2, in which said re-imaging means comprises a forwardly-facing hemisphere disposed on the opposite side of said first and second focal regions from said elliptical reflector, said hemisphere having said first focal region as its center.

4. The invention as claimed in claim 3, in which the equatorial plane of said hemisphere is substantially coincident with the latus rectum of said first parabolic reflector.

5. The invention as claimed in claim 4, in which said first parabolic reflector is cut off at said latus rectum thereof, and in which the rim of said hemisphere meets said first parabolic reflector at said latus rectum, the apex region of said first parabolic reflector thus being replaced by said hemisphere.

6. The invention as claimed in claim 1, in which said first parabolic reflector has a rim lying in a plane parallel to the altus rectum thereof, said rim being related to said rim of said elliptical reflector in such manner that radiation from said first focal region will be directly incident to said first parabolic reflector adjacent said rim thereof, and also in such manner that radiation from said first focal region and directed toward the space forwardly outside said rim of said first parabolic reflector will be incident to said elliptical reflector.

7. The invention as claimed in claim 1, in which said elliptical reflector is much less than half of a complete ellipse, and is cut off to form a rim substantially coincident with the latus rectum of said elliptical reflector.

8. The invention as claimed in claim 1, in which said second parabolic reflector is cut off to form a rim substantially coincident with the latus rectum therof, said second parabolic reflector being the portion between the apex of said second parabolic reflector and said rim thereof.

9. The invention as claimed in claim 1, in which said elliptical reflector is much less than half of a complete ellipse and is cut off to form a rim substantially coincident with the latus rectum of said elliptical reflector, in which said second parabolic reflector is cut off to form a rim substantially coincident with the latus rectum thereof, said second parabolic reflector being the portion between the apex of said second parabolic reflector and said rim thereof, and in which the rims of said second parabolic reflector and said elliptical reflector are substantially co-planar.

10. The invention as claimed in claim 1, in which reflector means are mounted between said second parabolic reflector and said first focal region to reflect radiation which would otherwise be incident to the back of said second parabolic reflector, the size of said reflector means being sufficiently small that radiation from said first focal region to major portions of said elliptical reflector is not obstructed.

11. The invention as claimed in claim 1, in which all of said reflectors are symmetrical and coaxial.

12. The invention as claimed in claim 1, in which the size of said opening in said elliptical reflector substantially coresponds to the size of said second parabolic reflector.

13. The invention as claimed in claim 4, in which said first parabolic reflector is cut off at said latus rectum thereof, in which the rim of said hemisphere meets said first parabolic reflector at said latus rectum, the apex region of said first parabolic reflector thus being replaced by said hemisphere, in which said elliptical reflector is much less than half of a complete ellipse and is cut off to form a rim substantially coincident with the latus rectum of said elliptical reflector, and in which the diameter of said hemisphere and that of said elliptical reflector are substantially the same.

14. The invention as claimed in claim 1, in which a re-imaging means is provided on the side of said first focal region opposite said elliptical reflector, and in which said elliptical reflector is sufficiently small that neither incident radiation to nor reflected radiation from said first parabolic reflector will strike said elliptical reflector.

15. The invention as claimed in claim 1, in which a source of radiation is mounted at said first focal region.

16. A bean-forming system, which comprises:
 a first concave parabolic reflector having a relatively wide end which is cut off in a plane parallel to the latus rectum thereof,
  said first parabolic reflector also having a narrow end which is cut off in a plane substantially coincident with the latus rectum thereof,
 a concave hemispherical reflector having a diameter substantially corresponding to that of said narrow end of said first parabolic reflector and meeting such narrow end at said latus rectum,
 a concave elliptical reflector forming substantially less than half of an ellipse and having a wide end cut off in the latus rectum of the ellipse,
  said elliptical reflector having a central opening in the apex region of the ellipse,
  said elliptical reflector being mounted within said first parabolic reflector and facing rearwardly toward said hemispherical reflector, the wide end of said elliptical reflector having substantially the same diameter as that of the narrow end of said first parabolic reflector and being spaced from said first parabolic reflector a distance sufficiently great that direct and reflected radiation from the focal point of said first parabolic reflector to said first parabolic reflector will not engage said elliptical reflector but instead will travel forwardly in a beam, said distance being sufficiently small that direct radiation from said focal point will not be permitted to pass through the wide end of said first parabolic reflector without engaging any reflector, and a second concave parabolic reflector having its wide end cut off in the latus rectum of said second parabolic reflector and facing forwardly toward said opening in said elliptical reflector, said second parabolic reflector being sufficiently large that radiation from said focal point of said first parabolic reflector and reflected off said elliptical reflector will be directed by said second parabolic reflector through said opening in a beam parallel to that from said first parabolic reflector, the latus rectum of said second parabolic reflector and that of said elliptical reflector being substantially co-planar, the first focal point of said elliptical reflector and the focal point of said second parabolic reflector being coincident, the second focal point of said elliptical reflector being coincident with said focal point of said first parabolic reflector, said focal point of said first parabolic reflector being the center of said hemispherical reflector.

References Cited

FOREIGN PATENTS

| | | |
|---|---|---|
| 763,376 | 12/1956 | England. |
| 708,577 | 5/1931 | France. |
| 459,381 | 9/1950 | Italy. |

NORTON ANSHER, *Primary Examiner.*

R. P. GREINER, *Assistant Examiner.*

U.S. Cl. X.R.

240—41.37; 350—294